Sept. 11, 1923.  1,467,620

F. C. LINDSEY

ENGINE CONTROLLING MECHANISM

Filed Sept. 25, 1920   5 Sheets—Sheet 1

Inventor,
F. C. Lindsey.
By Sterling P. Buck,
Attorney.

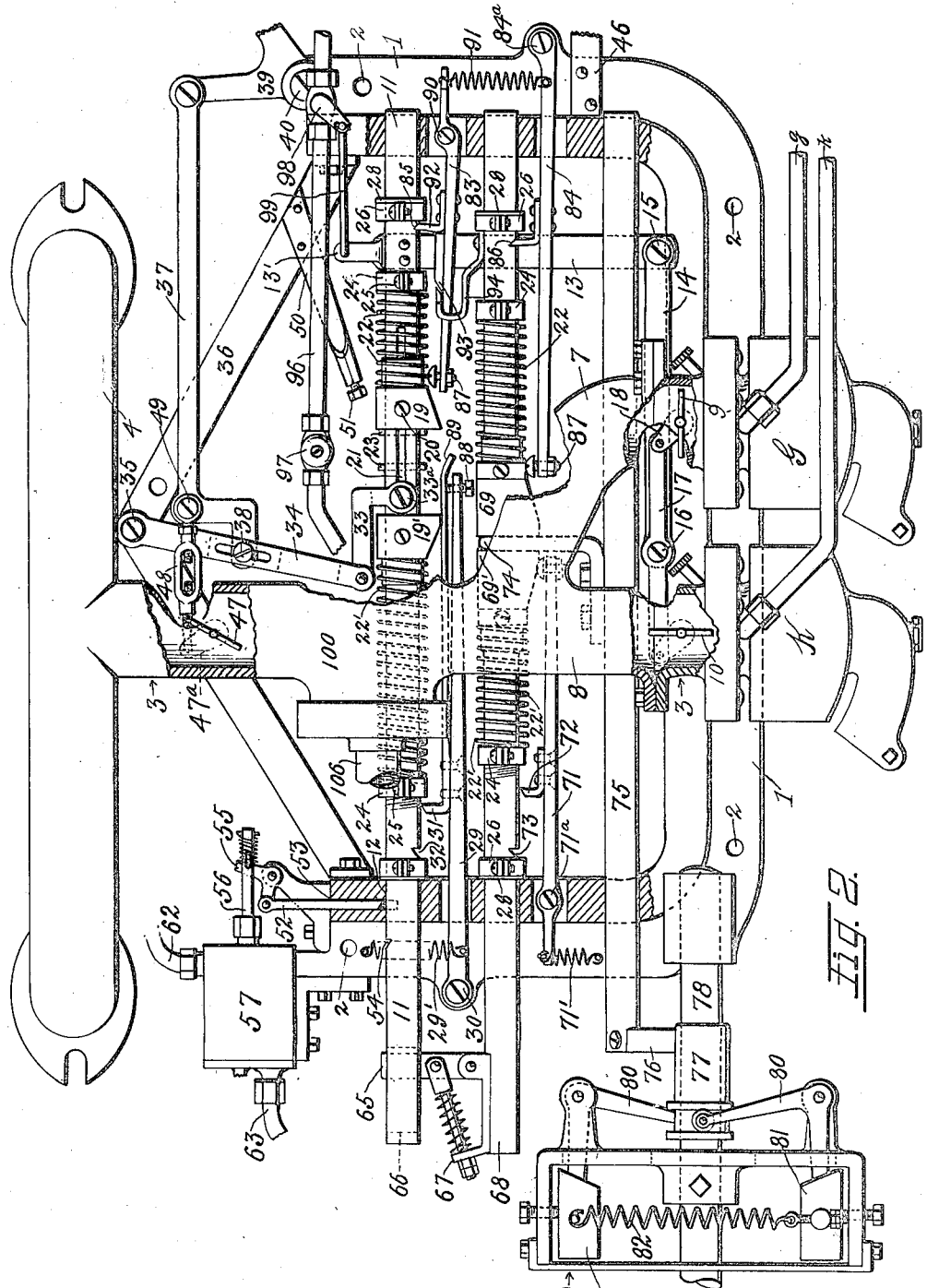

Sept. 11, 1923.
F. C. LINDSEY
1,467,620
ENGINE CONTROLLING MECHANISM
Filed Sept. 25, 1920    5 Sheets-Sheet 3
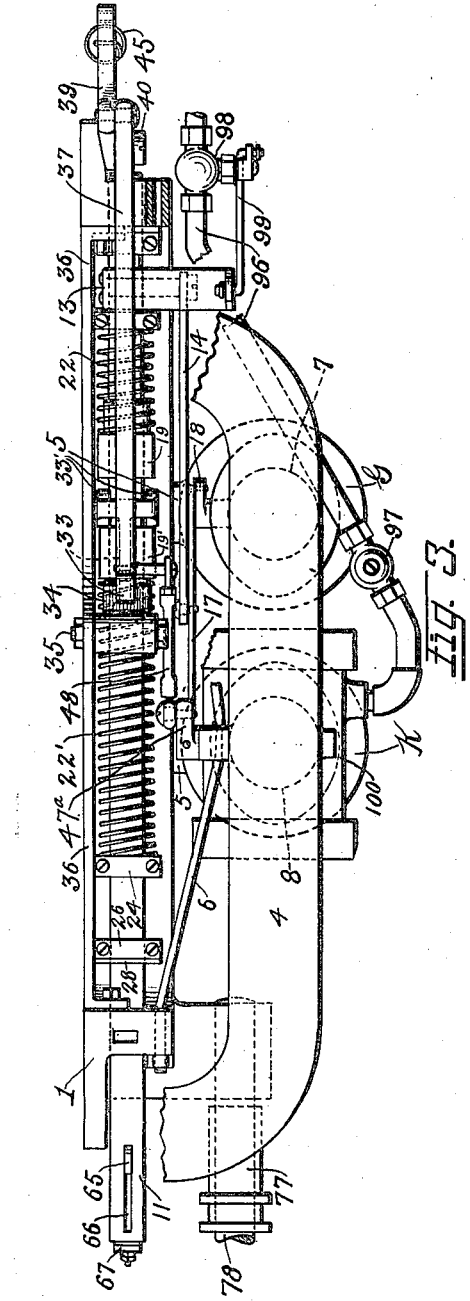
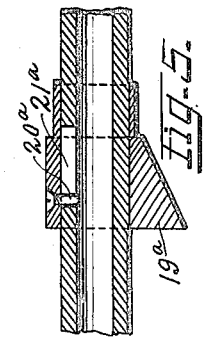
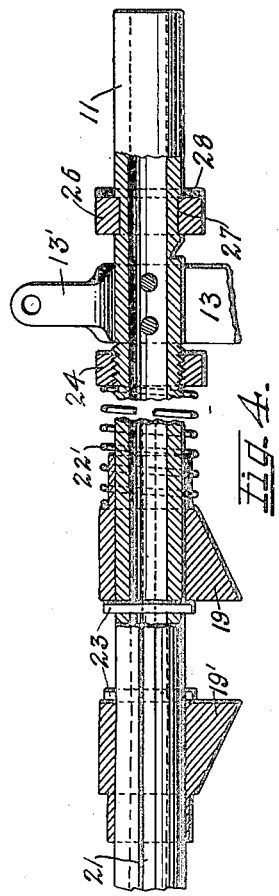
Inventor,
F. C. Lindsey.
By Sterling P. Buck,
Attorney.

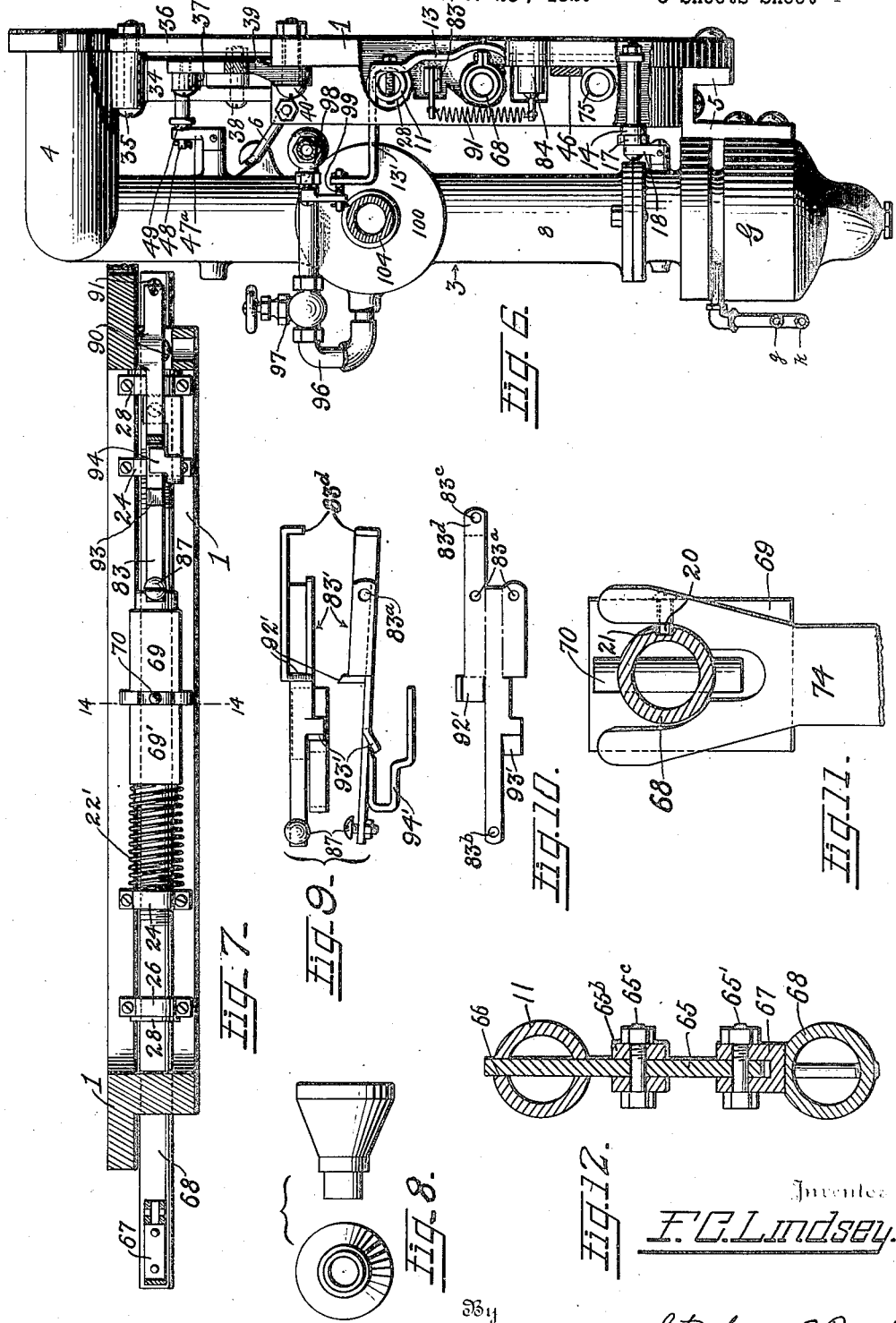

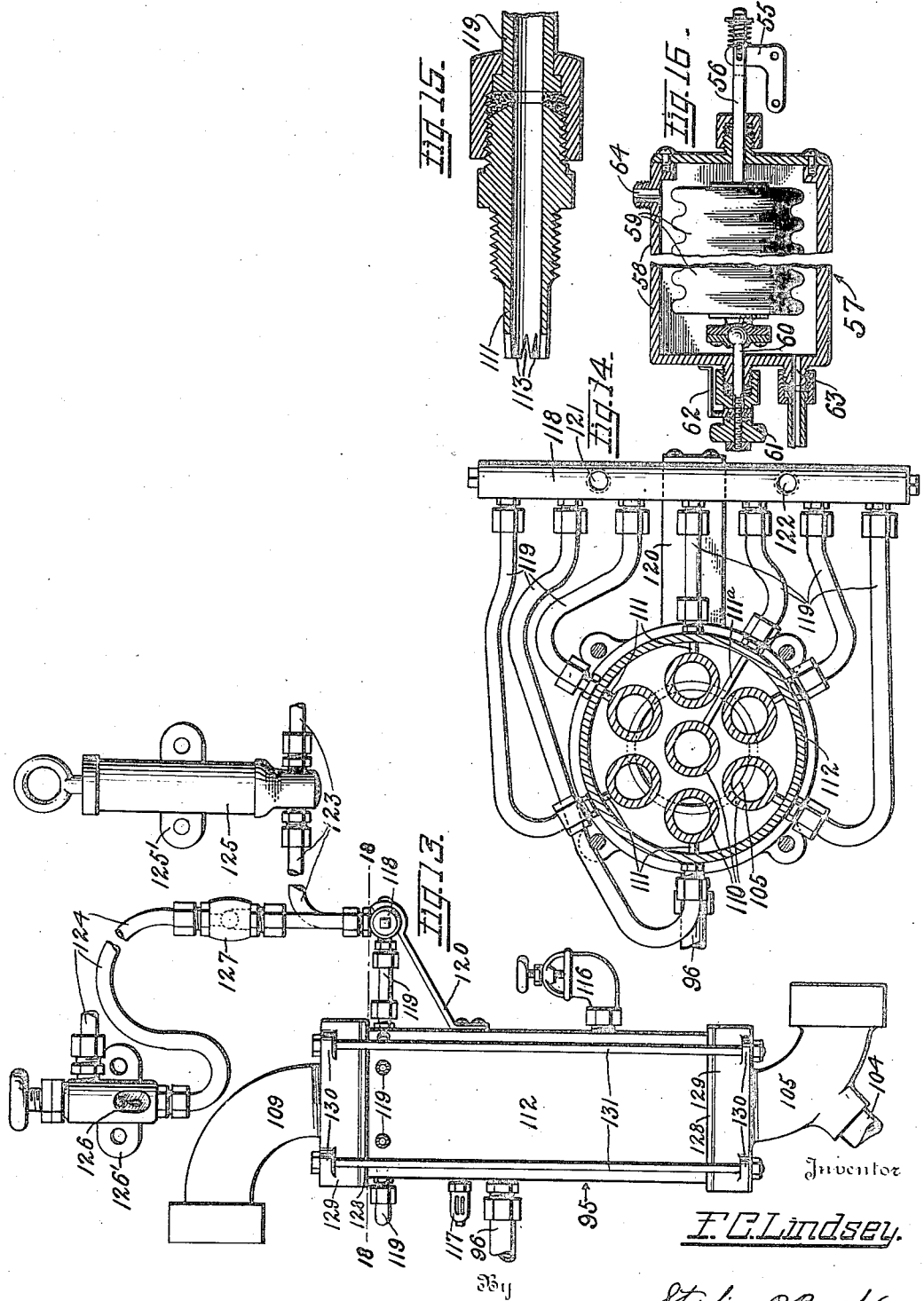

Patented Sept. 11, 1923.

1,467,620

UNITED STATES PATENT OFFICE.

FREDERICK C. LINDSEY, OF INDIANAPOLIS, INDIANA.

ENGINE-CONTROLLING MECHANISM.

Application filed September 25, 1920. Serial No. 412,885.

*To all whom it may concern:*

Be it known that I, FREDERICK C. LINDSEY, a citizen of the United States, residing at Indianapolis, in the county of Marion and State of Indiana, have invented certain new and useful Improvements in Engine-Controlling Mechanisms, of which the following is a specification.

This invention relates to engine-controlling mechanisms, and more specifically to an automatic starting and controlling device for internal combustion engines.

The main object of this invention is to provide a mechanism which supplies and automatically controls the feeding of different kinds or grades of fuel liquid in such manner that the starting of the engine is always accomplished with gasoline or other liquid that vaporizes at low temperatures; this mechanism being inherently capable of automatically and simultaneously ceasing to feed the gasoline and beginning to feed kerosene or other liquid that vaporizes at a relatively high temperature; this change from the primary liquid to the secondary liquid being made when, and not until, both the speed and heat of the engine have raised sufficiently to insure proper vaporization and combustion of the secondary fluid.

A further object of the invention is to provide the said mechanism with means which cause it to automatically and simultaneously cease feeding the kerosene or secondary fluid and resume the feeding of gasoline or primary fluid; this change being made when (and not until) the speed of the engine has lowered a predetermined degree, near the stopping point.

A further object is to provide in combination with said mechanism, a supplemental supplying and feeding device to be used either in connection with or in lieu of the secondary liquid feeding means; said device being intended to supply and vaporize liquids or oils that are heavier than kerosene, that is, crude petroleum or other oil that requires a higher degree of heat for its vaporization, or a longer application of heat.

A further object is to provide an improved fuel feeding conduit including means to utilize the exhaust of the engine for heating the gas during its passage from either of the two carbureters or from the supplemental vaporizer to the inlet of the engine-cylinders; this conduit also including means to thoroughly mix the gases while they are being heated.

Another object is to provide an improved vaporizer for crude petroleum or other relatively heavy oil; this vaporizer being very quickly and easily disassembled so that the interior parts thereof can be removed and cleaned when (or if) they become clogged or coated with the non-vaporizing constituents of the oil.

A further object is to provide an improved spring-actuated valve-operating mechanism and an improved thermostatic device in connection therewith.

Other objects and advantages will be pointed out or implied in connection with the accompanying drawings in which:

Fig. 2 is a view somewhat similar to Fig. 1, but showing parts in the normal running position; the governor (which is omitted in Fig. 1) being shown in this figure, and parts being omitted that are shown at the right in Fig. 1.

Fig. 3 is a top plan view, parts being broken off and other parts omitted for the sake of clearness.

Fig. 4 is an enlarged fragmental detail of one of the spring-pressed rods or tubes that control or operate the gas-controlling valves, together with the cams and other parts carried thereby.

Fig. 5 is a detail showing a modified form of the cam connection or guide shown in Fig. 4.

Fig. 6 is a right end view, parts being broken out for the sake of disclosing certain of the working parts.

Fig. 7 is a sectional view substantially along the line 7—7 of Fig. 1, one of the thrusting springs being omitted for the sake of clearness, the parts being in the position shown in Fig. 1.

Fig. 8 is an end view and side view of a conical cam that can be used in lieu of the cams shown in Figs. 1, 2, 4 and 5, by slightly changing the arrangement of parts so as to make room for this form of cam.

Fig. 9 is a modified form of cam-actuated lever and one of the cams that actuates it, in top plan and side elevation, these parts being formed from sheet metal blanks or stampings.

Fig. 10 is a sheet metal blank from which is formed the cam-actuated lever shown in Fig. 9.

Fig. 11 is an enlarged sectional view substantially along the line 11—11 of Fig. 1.

Fig. 12 is an enlarged sectional view along the line 12—12 of Fig. 1.

Fig. 13 is a side elevation of my improved heavy oil vaporizer and adjuncts, certain of the feeding tubes being in section.

Fig. 14 is an enlarged horizontal sectional view along the line 14—14 of Fig. 13.

Fig. 15 is an enlarged sectional view of one of the nozzles for feeding and distributing heavy oil in the vaporizing chamber shown in Figs. 13 and 14.

Fig. 16 is a sectional view of an adjustable thermostat such as may be employed for controlling the valve-actuating mechanism.

Figure 1:
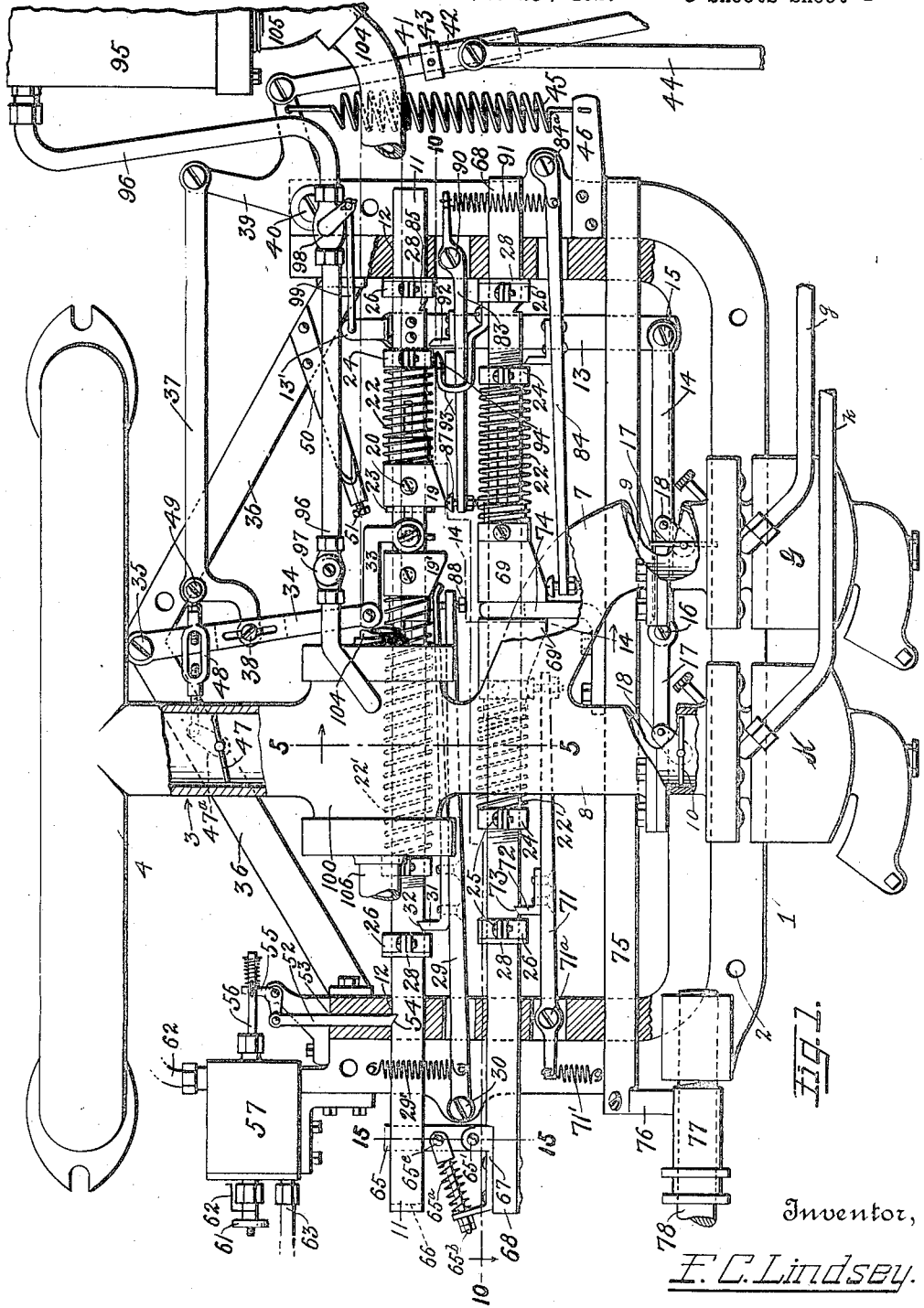
Fig. 1 is a view showing the major part of my device, parts being broken off for the lack of space and the sake of clearness; this view showing the parts in the starting position, that is, in the position for feeding vaporized gasoline or primary fluid.

Referring to these drawings in detail, in which similar reference characters correspond to similar parts throughout the several views, the invention consists in the construction and arrangement of parts which will be described and claimed as follows:

Attention is first directed to the main frame structure 1 which is provided with apertures 2 which may be suitably placed for receiving bolts, screws or other appropriate anchoring means for securing it to the cylinder-body of any internal combustion engine of ordinary construction. The gas feeding conduit 3 is preferably, though not essentially, formed integrally with the intake manifold 4; and, for the sake of presenting the device to the public in a unitary structure, as an attachment for different makes of internal combustion engines, the feeding conduit is preferably secured rigidly to the main frame 1. This may be effected by any appropriate means, one form of connection being shown at 5 in Figs. 3 and 6, and an additional connection or brace rod being shown at 6 in said figures.

The conduit 3 comprises two branches 7 and 8 which are provided with butterfly valves 9 and 10 respectively, and are also provided with carbureters G and K for gasoline and kerosene respectively. These carbureters may be of any appropriate well known construction and are not described in detail. In the arrangement illustrated, the carbureter G is for gasoline, and the carbureter K for kerosene; although the order may be reversed by changing the positions of the valves 9 and 10 on their axles, and they may be used with combustion fluids other than those specified. Pipes $g$ and $h$ communicate with the carbureters G and K respectively and are connectible with suitable tanks or sources of liquid fuel supply (not shown) which may be carried with the engine controlling mechanism when the engine is portable.

A reciprocatory rod or actuator 11 is mounted in apertures or guide bearings 12 of the frame 1, and carries a connecting bar or arm 13. This bar has a link 14 pivoted thereto at 15, and this link is pivoted at 16 to a link 17, the latter being pivoted to cranks or arms 18 of the valves 9 and 10. The valve 9 is always open when the engine is at rest or just starting, while the valve 10 is always closed during such periods. In other words, these valves are operated in unison by means of the link 17 and its connection with the actuator or rod 11. This rod has a pair of spring-pressed cams 19 and 19′ slidably mounted thereon, and these cams may be prevented from turning by any appropriate means, for instance, as more clearly shown in Figs. 2 and 11, they may each be provided with a screw or stud 20 which extends into a slot or groove 21 of the rod 11; or they may be of the form shown in Fig. 5 where the cam $19^a$ is provided with a stud $20^a$ which extends into the slot $21^a$. On the other hand, these cams may be circular in radial cross section, as shown in Fig. 8, by allowing more clearance for the reciprocation of these parts, and they may rotate freely and yet always be in an operative position. By using these rotary cams, the construction is somewhat simplified and cheapened, but will not permit the adjacent elements of the mechanism to be arranged so compactly as they are in Figs. 1 and 2.

Springs 22 and 22′ press the cams 19 and 19′ against pins or abutments 23, these springs being seated against collars or shoulders 24 which are preferably secured in any desired adjustment by means of internal screw threads meshing with external threads where indicated on the rod 11, these collars being in the form of clamps, having screws to tighten them in their places. Clamping collars 26 are also provided on the rod 11, and each of these collars is preferably set into an annular groove 27 (Fig. 4) which provides shoulders against which these collars are seated to prevent them from being driven longitudinally of the bar 11 when the latter is suddenly thrust first one way and then the other by means of the springs 22 and 22′, as will presently be explained. Cushioning washers of felt or other appropriate material are shown at 28, and when these washers strike the frame 1, they absorb the shock sufficiently to prevent injury to the frame or to the collars and rod.

A detent or lever 29 is pivoted to the frame 1 at 30. This lever is provided with a lateral or upward extension or dog 31 which engages with a notch 32 in the rod 11 and holds the rod 11 against the tendency of the spring 22' to thrust the rod 11 leftwards. It should be understood, however, that the spring 22 normally (or during rest of the engine) presses rightward against the contiguous collar 24 and would hold the rod 11 in the normal position (shown in Fig. 1) even if the dog 31 of the detent 29 should become disengaged from the notch 32. The reason for this is that a shifting link 33 normally presses against the cam 19 and slightly presses the spring 22 rightward. However, when the link has been shifted to the position shown in Fig. 1, for starting the engine, the spring 22 is in equilibrium between the abutments 23 and 24, and the pressure of the link 33 is shifted to the cam 19' and thence to the spring 22', so that the rod 11 now tends to move leftward, but cannot because of its engagement with the detaining lever or detent 29, also because of other detaining elements which will be described and explained later.

The link 33 is pivotally connected to a shifting lever 34, the latter being pivotally mounted, at 35, on an upward extension 36 of the frame 1. This extension may be either formed integrally with the frame 1 or secured thereto in the manner shown. A link 37 is pivotally and adjustably connected at 38 to the lever 34, and is also pivotally connected to a bell-crank-lever 39, the latter being pivotally mounted on the frame 1 at 40 and being pivoted to a rod or link 41 which may connect to the foot-actuated accelerator of an automobile, or to any form of manually actuated device (not shown). However, the rod 41 may, itself, be employed as a manually actuated device. Moreover the rod or link 41 is provided with a sleeve 42 which is slidably mounted thereon, and with a collar or shoulder 43 which is fixed thereon. A rod or link 44 is pivotally connected to the sleeve 42 and is connectible with the usual handle, of an automobile, which opens and closes the throttle of the engine. Because of this arrangement of the sliding sleeve and fixed collar, the foot actuated rod 41 can be actuated without affecting the hand actuated rod 44. A retractile spring 45 is secured to the lever 39 and to an arm 46 which is rigid with the frame 1. This spring holds the parts 38, 37, 34 and 33 in the normal position, but yields to the action of the rod 41.

The throttle is indicated at 47 and is provided with an arm 47ª which is pivoted to a turnbuckle or longitudinally adjustable link 48, the latter being pivotally connected to the link 37 and operable thereby to turn the throttle 47. It will be seen, therefore, that the link 37 actuates and adjusts both the throttle and the cams 19 and 19'. The link 33 is preferably bifurcated as shown at 33' in Fig. 3, and the furcations thereof terminate in discs or widened portions that normally extend approximately across the space between the cams 19 and 19'. One or both of the furcations of the link 33 are provided with a stud 33ª that extends into the groove 21 and keeps the link 33 in proper working position. An arm 50 is secured on the extension 36 of the frame 1, and a screw 51 is secured in the end of this arm in a position to form an abutment to variably limit the rightward movement of the link 33.

In addition to the previously described detaining means, I provide a detent or dog 52 which is mounted to slide in a recess or bearing 53 of the frame 1 and engages with a notch 54 of the rod 11. This dog or rod 52 is pivotally connected to a bell-crank or lever 55 which has a resilient connection with a reciprocatory rod or arm 56 of a thermostat 57. This thermostat may be of any appropriate construction, but is preferably similar to that illustrated in Figs. 1, 2 and 16. Referring to the latter figure, it will be seen that the thermostat comprises an outer chamber or water container 58, and that an inner receptacle or container 59 is enclosed in the container 58, the latter being provided with packed bearings or stuffing boxes through the rod 56 and an adjusting rod or screw 60 extend. A nut or adjusting knob 61 is threaded on the stem or screw 60, and a lock-nut may be provided in the screw 60, as shown, to hold the knob 61 in adjustment. An indicating finger may be mounted to turn with the knob 61, and a dial or scale (not shown) may be provided on the adjacent end of the container 58. By turning the knob 61, the detent 53 can be adjusted to suit varying conditions, through the medium of the elements 55 and 56. The container 58 is provided with inlet and outlet openings which are connectible to the water jacket or cooling system of the engine, and is thereby kept full of circulating water which thermally acts upon the longitudinally or axially expansible and retractable receptacle 59 which is filled with alcohol or other liquid of a high coefficient of expansion. On account of the peculiar construction of the receptacle 59, it yields more readily to pressure in its axial direction than in its radial direction, and so, when the water in the receptacle 58 has reached a sufficiently high degree of temperature, the expansion of the alcohol in the receptacle 59 expands the latter in a manner to effect movement of the rod 56 outward, thereby causing the lever 55 to lift the dog or rod 52 out of the notch 54.

However, even though the detents 29 and 52 have released the rod 11, the latter cannot move leftward, because of the provision of a third detent or controlling means including an arm or dog 65 which extends through a slot 66 (Fig. 3) of the rod 11 and abuts against the right end of this slot when the engine is at rest and before it has attained a predetermined speed after being started. This arm is pivotally mounted on a bracket 67 which is secured to a reciprocating rod 68, the latter being somewhat similar to the rod 11 and similarly mounted in bearings of the frame 1 for reciprocatory movement. This rod 68 is provided with clamping collars 24 and 26 similar to those of the rod 11, also cushioning washers 28. Cams 69 and 69' are mounted to slide on the rod 68 and are held against turning in a similar manner or by similar means as are the cams 19 and 19'. Springs 22 and 22' are also provided for this rod 68 and are similarly seated against the collars 24, so as to actuate the cams 69 and 69' and normally hold them in the position shown in Fig. 1. A pin or stop 70 (Fig. 7) extends radially through the rod 68 and limits movement of the cams along the rod 68. This rod is held in its normal position, as shown in Fig. 1, by a detent or lever 71 having a lateral extension or dog 72 which engages with a notch 73 of the rod 68 and co-acts with the latter and its arm 65 for holding the rod 11 against untimely leftward movement.

The release of the detent 71 is effected by the leftward movement of the cam 69', and this movement is effected by a bifurcated arm or extension 74 of a shifting rod 75 which is slidably mounted in apertures or bearings of the frame 1. This rod is also provided with an arm 76 which connects with a governor-controlled sleeve 77 that slide on a shaft 78 of the governor 79. This governor may be of any appropriate construction, and its shaft 78 is connectible with and operable by any rotary part of the engine, or machine operated thereby, so that the speed of the machine or engine controls adjustment of the rod 75. In other words, when the engine "speeds up," the sleeve 77 is drawn, by levers 80 of the governor, to the position shown in Fig. 2, this being effected by centrifugal force of the governor-weights 81 against the action of a retractile spring 82. This spring returns the parts 77, 75 and 74 to normal when the engine stops. However, in moving leftward, the arm 74 carries the cam 69' leftward and thereby stores power in its spring 22', and at the same time releases the rod 68 by moving the detent 71 out of engagement with the notch 73. Being thus released, the rod 68 yields to the pressure of its spring 22' and is instantly thrust to its leftward position shown in Fig. 2, thus moving its arm 65 out of effective engagement with the rod 11.

*Operation for starting.*

In starting the engine, the engineer or operator operates the starting rod 41 in the usual way, thereby opening the throttle 46 and at the same time compressing the spring 22' of the rod 11. The valves 17 and 18 remain in the position shown in Fig. 1 so that gasoline vapor is fed to the engine, while the kerosene vapor is shut off. By the act which opened the throttle, the operator also stored power in the upper spring 22', and caused the cam 19' to depress the lever or detent 29 and disengage it from the rod 11. When the engine has "speeded up," the arm 65 also releases the rod 11 in the manner previously explained, but unless the engine is sufficiently hot to insure proper combustion of kerosene vapor, the thermostat and its connections with the rod 11 prevents movement of the latter. When both the heat and speed are sufficient to move the detents 52 and 71 out of effective position, the upper spring 22' will instantly thrust the rod 11 to its leftward position, so that its arm 13 and the links 14 and 17 will simultaneously close the gasoline-vapor passage and open the kerosene-vapor passage, by means of the valves 9 and 10, so that gasoline will be conserved while the cheaper or more economical oil will be used.

While the engine is running at high or moderate speed the rods 11 and 68 are held in the working position (Fig. 2) by detents 83 and 84 which engage respectively with notches 85 and 86 of the rods 11 and 68. These levers or detents are similar to the levers 29 and 71, but are reversed in position and operation; that is, the cams on their lateral extensions or dogs are oppositely inclined from those which engage the notches 32 and 73. The levers 71, 83 and 84 are each provided with an adjusting screw or bolt whose head is in position to be depressed by one of the cams 19, 69 and 69', but the lever 29 has a different form of screw adjustment in which a screw 88 is operable to adjust a spring 89, and the latter is in position to be depressed by the cam 19'. This latter construction provides a comparatively level surface for the cam 19' to slide on, so that it can return to its normal position without interruption, it being understood that this cam 19' has a relatively great extent of movement so that the throttle 46 can be opened to its widest extent even after the rod 11 has reached its furthermost position to the left. However, the forms and construction of these levers or detents may be varied or modified without altering the principle of the device; for instance, they may be formed of blanks of sheet metal, as illustrated in Figs. 12 and 13, the latter figure representing a sheet metal blank from which the lever 83' is formed. This lever includes an apertured intermediate portion through which the screw or pivot 90 extends, these intermediate apertures being indicated at 83ª. It should be understood that the blank is bent along the longitudinal broken lines in Fig. 13 to bring these apertures into axial alinement, as shown in Fig. 12. The front or left end of this lever is apertured at 83$^b$ to receive the adjusting screw 87, and its rear end is apertured at 83$^c$ to engage with a spring 91 such as shown engaged with the lever 83 in Figs. 1 and 2. This rear end of the blank may be bent laterally at the adjacent dotted line to form an ear 83$^d$ to space the spring 91 from the frame 1 and thus provide clearance for the reciprocating rod 68 as shown in Fig. 6. The lever 83 is provided with a lateral extension or dog 92 and a cam 93 which are secured thereto by any appropriate means, and the lever 83′ has the corresponding dog and cam 92′ and 93′, respectively, formed integrally therewith. The spring 91 serves to hold both the levers 83 and 84 in their operative position, although separate springs of a different kind may be employed instead. The levers 29 and 71 are provided with actuating springs 29′ and 71′ respectively, and the levers 71 and 84 are pivotally mounted on the frame 1 at 71$^a$ and 84$^a$ respectively.

A cam-hook 94 or a slightly different cam-hook 94′ (Fig. 9) is mounted on and rigid with the bar or rod 68 and co-acts with the cam 93 or 93′ (Fig. 9) to lower the lever 83 or 83′ (Fig. 12) out of engagement with the bar or rod 11 for permitting the latter to return to its normal position under the action of the spring 22 as follows:

*Automatic return to normal.*

When the link 37 is pulled rightward for closing the throttle, this link also swings the lever 34 and link or shifter 33 rightward, thereby permitting the cam 19′ to return to the adjacent stop 23, and depressing the spring 22 by moving the cam 19 rightward. This stores power in the spring 22 so that it tends to move the rod 11 to the right, viz, to normal, and when the cam 19 has moved sufficiently far, it depresses the lever or detent 83 out of engagement with the rod 11. This rod now yields to the pressure of the spring 22 and is suddenly thrust rightward to normal and causes the elements 13, 14, 17 and 18 to close the valve 10 of the kerosene carbureter and open the valve 9 of the gasoline carbureter. Now, when the engine has "slowed down" sufficiently, the governor 79 moves the shifting rod 75 rightward so that its arm 74 pushes the cam 69 rightward, thereby compressing and storing power in the lower spring 22, but the detent 84 holds the rod 68 until the cam 69 has moved sufficiently far to depress the detent 84 out of engagement with the rod 68, whereupon, the latter is suddenly thrust rightward by its spring 22, and its arm 65 now stands in position to detain the rod 11 in its normal position until the operator again operates the link 37 for starting as previously described. It should be understood, of course, that the detents 29 and 71 automatically take effect and control the rods 11 and 68 by entering the notches 32 and 73 when these rods move to normal. To prevent a deterimental or annoying shock from taking place when the rod 68 brings its arm 65 against the right end of the slot 66, this arm is pivotally mounted and spring pressed as shown in Figs. 1, 2 and 15. Its pivotal connection with the bracket 67 is shown at 65′, and a spring 65$^a$ is mounted on a rod 65$^b$ which has one end pivoted to the arm 65 and its other end slidable through a bearing of the bracket 67. Adjusting nuts are provided on the rod 65$^b$ for adjusting the position of the arm 65. The rod 65$^b$ has an apertured bifurcated end through which its pivot 65$^c$ extends.

After stopping the engine if it is again started before the engine cools, the thermostatic detent 52 remains in its ineffective position, so that as soon as the engine speeds up, this valve-controlling mechanism automatically operates to change from feeding gasoline vapor to feeding kerosene vapor.

*Auxiliary or supplemental fuel feed.*

At the upper right portion of Fig. 1 is indicated a frament of a supplemental or auxiliary oil vaporizer 95. This may be used for an additional supply of gas or vapor from kerosene, although it is mainly intended for a supply of vapor from crude petroleum or other oil that is heavier than kerosene. This vaporizer communicates with the feeding conduit 3 through the medium of a feed-pipe 96, the latter being provided with a valve which is operable to open and close the pipe at the will of the user. If the owner or driver of an automobile embodying this device is driving through a section of country where crude oil is plentiful and kerosene and gasoline are scarce or expensive, he may use crude oil exclusively under the most favorable weather conditions, etc., and conserve the kerosene and gasoline for less favorable conditions; or he may feed both crude oil and kerosene simultaneously and in any desired proportions by regulating the valve 97 and the needle-valve of the kerosene carbureter.

The foregoing is made possible by the mechanism described in the foregoing and following. The pipe 96 is also provided with a valve 98 which has an arm pivotally connected to an upward and lateral extension 13′ of the arm 13 through the medium of a link 99. When the rod 11 and arm 13 move for operating the valves 9 and 10, they also operate the valve 98 so as to open the latter when the valve 9 (gasoline) is closed, and vice versa. In other words, the valve 98 opens and closes in unison with the valve 10 of the kerosene-carbureter.

*Universal heater and mixer.*

The intermediate portion of the feeding conduit 8 is broadened to form a mixing and heating chamber 100 (Figs. 1, 2, 3, and 6). This chamber is in open communication with an inlet pipe 104 and an outlet pipe 106. The inlet pipe 104 is in open communication with a pipe-section 105 of the engine's exhaust passage (Figs. 1, 6 and 13).

The pipe 96 (Figs. 1, 2, 3 and 6) is in open communication with the chamber 100 so that its output of gas is also heated and thoroughly mixed with air or carbureted mixture that comes through the conduit 3 from the kerosene carbureter K.

*The auxiliary or heavy oil vaporizer.*

Referring now to Figs. 13, 14, and 15, it will be seen that the oil vaporizer 95 is interposed between and in open communication with sections 105 and 109 of the exhaust pipe. The vapor from this chamber 95 passes through the pipe 96 to the heating or re-heating chamber 100 in consequence of the suction through the latter in a manner previously known. The hot exhaust vapor passes from the pipe-sections 105 and 104, thence through the chamber 100 and out through the pipe 106 because of the pressure of the exhaust through this pipe 104. However, the pipe 106 may be caused to communicate with the intake of the engine, if desired, so that the hot fluid will be impelled by both suction and exhaust pressure. At 116 is shown an air inlet which may be in the form of a spring-pressed valve or check valve of any appropriate kind, and at 117 is indicated a safety device such as a pop-valve or pressure-relief of any appropriate kind. The parts 96, 116 and 117 terminate at the interior surface of the cylindrical shell or intermediate portion 112.

For the purpose of feeding kerosene or heavier oil to the vaporizer, 95, I provide a distributing tube or chamber 118 having closed ends and having one side in open communication with the nozzles 111 through the medium of tubes or pipes 119. One of the nozzles is elongated, as shown at 111ª, so that it reaches the central one of a set of heating tubes 110 (Fig. 14). The distributing tube 118 is preferably supported by a plate or bracket 120 secured on the member 112, and inlet openings 121 and 122 are provided in the tube 118 for communication with the reservoir or oil supply source (not shown) through the medium of supply conduits 123 and 124 respectively. The supply conduit 123 has a priming pump 125 interposed therein, and the conduit 124 has a sight-feed 126 and a check-valve 127 interposed therein, the latter being arranged to prevent back pressure in the conduit 124. When the engine embodying this device is embodied in an automobile, the sight feed 126 and priming pump 127 are preferably secured to the dashboard or other convenient part of the machine, and apertured ears 125' and 126' are provided for this purpose.

It is not intended to limit this invention to the details of construction and arrangement as described and illustrated, but changes may be made within the scope of the inventive ideas as implied and claimed.

What I claim as my invention is—

1. In a fuel feeding mechanism for internal combustion engines, a fuel feeding conduit, carbureters arranged to feed different gases into said conduit, a throttle between said carbureters and a part of the conduit that is connectible to the engine, means settable for holding the throttle open and maintaining the carbureters respectively effective and ineffective, a dog for holding at least a part of said means in the set position, and means controllable by operation of the engine for releasing the first said means from control of said dog.

2. In a fuel feeding mechanism for an internal combustion engine, a fuel feeding conduit, primary and secondary carbureters arranged to feed different gases into said conduit, a throttle in said conduit, manually operable means to open and close said throttle, and carbureter-controlling mechanism settable by said manually operable means and being releasable from set position by operation of the engine, said carbureter-controlling mechanism being automatically operable when released to cause one of said carbureters to feed and to cause the other one of said carbureters to cease feeding.

3. The combination with the intake manifold of an internal combustion engine, of a feeding conduit in open communication with said manifold and including two branches for the inlet of different kinds or grades of combustion fluid, valves in said branches to control the flow of fluid therethrough, a throttle in the conduit between said manifold and said branches, manually operable means to open and close said throttle, and mechanism controllable by said manually operable means and by the operation of the engine to open one of said valves and close the other one of said valves.

4. The combination with the intake manifold of an internal combustion engine, of a feeding conduit in open communication with said manifold and including two branches for the inlet of different kinds or grades of combustion fluid, valves in said branches to control the flow of fluid therethrough, said conduit including a heating chamber between said valves and said manifold so that the fluid from either valve passes through said heating chamber, a throttle in said conduit between said manifold and said valves, manually operable means to open and close said throttle, and mechanism controllable by said manually operable means and by the operation of the engine to open one of said valves and close the other one of said valves.

5. In a fuel feeding mechanism for an internal combustion engine, a fuel feeding conduit, two carbureters arranged to feed different gases into said conduit, a third carbureter provided with means to feed gas into said conduit and with a valve to control the flow of its gas, means settable for maintaining the said two carbureters respectively effective and ineffective and maintaining the said third carbureter ineffective, a dog for holding the last said means in its set position, and means controllable by operation of the engine for releasing the second said means from control of the dog.

6. The structure defined by claim 2, an oil vaporizer in open communication with said supplemental combustion-fluid supply pipe, said conduit including a heating chamber between said manifold and said branches so that the fluid from either branch passes through said heating chamber, and a conduit for heating-fluid extending through said oil vaporizer and through said heating chamber and being connectible to the exhaust outlet of the engine.

7. The combination with the intake manifold of an internal combustion engine, of a feeding conduit in open communication with said manifold and including two branches for the inlet of different grades or kinds of combustion fluid, valves in said branches to control the flow of fluid therethrough, mechanism operable to hold said valves open and closed respectively and to reverse the position of said valves, a detent for holding said mechanism against operation, a throttle in said conduit, a manually operable device for opening and closing the throttle, and means operable by the throttle-opening movement of said device for releasing the valve-controlling mechanism from said detent.

8. The combination with the intake manifold of an internal combustion engine, of a feeding conduit in open communication with said intake manifold and including two branches for the inlet of different grades or kinds of combustion fluid, valves in said branches to control the flow of fluid therethrough, mechanism operable to hold said valves open and closed respectively and to reverse the open and closed positions of said valves, a detent operable to hold said mechanism against operation, a throttle in said conduit, a manually operable device for opening and closing the throttle, and means operable by the throttle-opening movement of said device for releasing the valve-controlling mechanism from said detent.

9. The combination with the intake manifold of an internal combustion engine, of mechanism (9, 10 and 14—18) including two fuel-controlling valves (9 and 10) to regulate the flow of different fuels into said manifold, an actuator (11 and 13) mounted for movement relative to said manifold and operatively connected with said mechanism for actuating said valves, said actuator having two effective positions for holding said valves open and closed respectively, a dog 52 to hold said actuator in one of said effective positions, a second dog 31 for holding said actuator in said one of the effective positions, thermally actuated means 55—57 to release said actuator from the first said dog, a throttle (47) to control said fuels, and mechanism (47ª, 48, 49, 37, 38, 34 and 43) operable to simultaneously open said throttle and release said actuator from the second said dog.

10. The combination with the intake manifold of an internal combustion engine, of mechanism (9, 10 and 14—18) including two fuel-controlling valves (9 and 10) to regulate the flow of different fuels into said manifold, an actuator (11 and 13) mounted for movement relative to said manifold and operatively connected to said mechanism so as to actuate said valves, said actuator having two effective positions for holding said valves open and closed respectively, a dog (52) to hold said actuator in one of said effective positions, a second dog (83 and 92) to hold said actuator in said one of the effective positions, a thermostat 57 for releasing said actuator from the first said dog, spring-actuated means (68 and 94) to render the second said dog ineffective, means to detain said spring-actuated means (84) against the action of its spring, and speed-controlled means (69 and 74—82) to release said spring-actuated means from the means which detains the spring actuated means.

11. The structure defined in claim 9, a third dog (31) to hold said actuator in said one of its effective positions, and means (69' and 74—82) controllable by speed of the engine for rendering the said third dog ineffective.

12. The structure defined by claim 9, a detent (83—92) for holding said actuator in its other effective position, and means (19) operable by the last said mechanism for releasing said actuator from said detent.

13. The combination with a fuel-passage (8) of an internal combustion engine, a fuel-controlling valve (10) in said fuel-passage, a throttle (74) in said fuel-passage, a second fuel passage (7) communicating with the first said fuel-passage at a point between said valve and said throttle, a valve (9) in said second fuel-passage, an actuating rod (11) connected with said valves for opening and closing them, a spring (22') operable to shift said rod in one direction to one of two effective positions, a detent (29—31) for holding the actuating rod in the other one of the effective positions, and a member (19') slidable on said actuating rod and operable to release said actuating rod from said detent and to store power in said spring and thereby shift the actuating rod to the first said one of its effective positions, and means (47ª, 48, 49, 37, 38 and 33) to simultaneously actuate said throttle and the member which releases said actuating rod.

14. The combination with the intake manifold of an internal combustion engine, of a feeding conduit (3) in open communication with said intake manifold and including two branches (7 and 8) for the inlet of different grades or kinds of combustion fluid, valves (9 and 10) in said branches to control the flow of fluid therethrough, mechanism (11 and 13—18) for holding said valves open and closed respectively and for reversing the open and closed relation of the valves, said mechanism including a bodily shiftable member (11 and 13), a detent (29—31) engageable with said shiftable member for holding the latter in its normal position, a cam on said shiftable member, and correlated members (33, 34, 38, 37 and 39) coacting with said cam for releasing said shiftable member from said detent and then shifting said shiftable member.

15. In a fuel feeding mechanism for an internal combustion engine, a frame (1) attachable to the body of an engine, an intake manifold attachable to said body in communication with the fuel intake of the latter, a feeding conduit (3) in open communication with said intake manifold and connected to said frame, valves (9 and 10) in said conduit, a link (17) connected to said valves for holding them respectively open and closed, a valve-controlling device (11, 13 and 14) movably mounted on said frame and connected by said link to said valves, a detent (28 or 83) on said frame and operable to hold said valve-controlling member against operation, a throttle (47) in said conduit, means (47ª) for controlling said throttle, and means (33 and 19' or 19) operable to release said valve-controlling device from said detent, the last said means being operatively connected with the means for controlling the throttle.

16. In a fuel feeding mechanism for an internal combustion engine, a frame (1) attachable to the cylinder-body of the engine, an intake manifold attachable to said body in communication with the fuel intake of the latter, a feeding conduit (3) including two branches (7 and 8) and being in open communication with said intake manifold and fixed to said frame, valves (9 and 10) in said branches, a rod (11) slidably mounted in said frame, a link (17) connected to said valves in the relation for holding one valve open and the other closed, means (13—16) operatively connecting said link to said rod, a detent (29—31) on said frame and operable to hold said rod in its normal position, a throttle (47) in said conduit, means (47ª and 48) operable to open and close said throttle, and means (37, 34, 33, 19' and 89) operable to release said rod from said detent and to actuate the means for opening and closing the throttle.

17. The combination of a fuel-passage (8) of an internal combustion engine, a fuel-controlling valve (10) in said fuel-passage, a second fuel-passage (7) communicating with the first said fuel-passage at a point between said valve and said throttle, a valve (9) in said second fuel-passage, an actuating rod (11) connected with said valves for opening and closing them, a spring (22') operable to shift said rod in one direction to one of two effective positions, and a member (19') slidable on said actuating rod and operable to release said actuating rod from said detent and to store power in said spring and thereby shift the actuating rod to the first said one of its effective positions.

In testimony whereof I affix my signature.

FREDERICK C. LINDSEY.